United States Patent
Reddy et al.

(10) Patent No.: US 12,413,970 B2
(45) Date of Patent: Sep. 9, 2025

(54) SYSTEM FOR RESOURCE SHARING OVER A SECURE WIRELESS NETWORK COMMUNICATION CHANNEL

(71) Applicant: BANK OF AMERICA CORPORATION, Charlotte, NC (US)

(72) Inventors: Kumara Swamy Kariyappa Reddy, Charlotte, NC (US); Michael G. Horstman, Chicago, IL (US); Manu Jacob Kurian, Dallas, TX (US); Ganesh Bonda, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 311 days.

(21) Appl. No.: 18/093,548

(22) Filed: Jan. 5, 2023

(65) Prior Publication Data
US 2024/0236665 A1    Jul. 11, 2024

(51) Int. Cl.
*H04W 12/06* (2021.01)

(52) U.S. Cl.
CPC ................ *H04W 12/06* (2013.01)

(58) Field of Classification Search
CPC .. H04W 12/06; H04W 12/062; H04W 12/068
See application file for complete search history.

(56) References Cited

U.S. PATENT DOCUMENTS

| | | |
|---|---|---|
| 8,149,802 B2 | 4/2012 | Lou |
| 8,543,121 B2 | 9/2013 | Ryan |
| 8,594,724 B2 | 11/2013 | Zhou |
| 8,649,341 B2 | 2/2014 | Guey |
| 8,654,725 B2 | 2/2014 | Edwards |
| 8,913,564 B2 | 12/2014 | Yuan |
| 9,014,030 B2 | 4/2015 | Struhsaker |
| 9,049,699 B2 | 6/2015 | Touboul |
| 9,094,314 B2 | 7/2015 | Martin |
| 9,130,697 B2 | 9/2015 | Struhsaker |
| 9,137,078 B2 | 9/2015 | Stapleton |
| 9,301,305 B2 | 3/2016 | Picker |
| 9,413,860 B2 | 8/2016 | Shatzkamer |
| 9,451,591 B2 | 9/2016 | Cucala Garcia |
| 9,554,301 B2 | 1/2017 | He |
| 9,621,246 B2 | 4/2017 | Wala |
| 9,706,430 B2 | 7/2017 | Picker |
| 9,743,406 B2 | 8/2017 | Chen |

(Continued)

*Primary Examiner* — Olugbenga O Idowu
(74) *Attorney, Agent, or Firm* — Moore & Van Allen PLLC; Nicholas C. Russell

(57) ABSTRACT

A system is provided for resource sharing over a secure wireless network communication channel. In particular, the system may include an endpoint device equipped with wireless communication capabilities. An application installed on the endpoint device may cause the endpoint device to perform a wireless scan of a network for nearby devices that are configured to send, receive, and/or exchange resources. Each device may be associated with a unique identifier, where the unique identifier may be associated with one or more resource accounts. Upon receiving a selection of a unique identifier, the endpoint device may initiate a resource transfer to the device associated with the selected identifier. In this way, the system may provide a secure and efficient way to exchange resources over a wireless communication channel.

20 Claims, 6 Drawing Sheets

(56) References Cited

U.S. PATENT DOCUMENTS

| | | |
|---|---|---|
| 10,594,457 B2 | 3/2020 | Suh |
| 11,050,888 B2 | 6/2021 | Russell |
| 11,412,417 B2 | 8/2022 | Andreoli-Fang |
| 2018/0324599 A1 | 11/2018 | Trajkovic |
| 2020/0178352 A1 | 6/2020 | Cho |
| 2024/0211903 A1* | 6/2024 | Bimolaksono ..... G06Q 20/4014 |

* cited by examiner

SYSTEM FOR RESOURCE SHARING OVER A SECURE WIRELESS NETWORK COMMUNICATION CHANNEL

FIELD OF THE INVENTION

The present invention embraces a system for resource sharing over a secure wireless network communication channel.

BACKGROUND

There is a need for an efficient and secure way to perform wireless resource sharing.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for resource sharing over a secure wireless network communication channel. In particular, the system may include an endpoint device equipped with wireless communication capabilities. An application installed on the endpoint device may cause the endpoint device to perform a wireless scan of a network for nearby devices that are configured to send, receive, and/or exchange resources. Each device may be associated with a unique identifier, where the unique identifier may be associated with one or more resource accounts. Upon receiving a selection of a unique identifier, the endpoint device may initiate a resource transfer to the device associated with the selected identifier. In this way, the system may provide a secure and efficient way to exchange resources over a wireless communication channel.

Accordingly, embodiments of the present disclosure provide a system for resource sharing over a secure wireless network communication channel, the system comprising at least one non-transitory storage device; and at least one processor coupled to the at least one non-transitory storage device, wherein the at least one processor is configured to receive a request from a user to initiate a resource transfer; perform a scan of a wireless communication channel for endpoint devices within a wireless network; identify, based on the scan, one or more unique identifiers associated with the endpoint devices within the wireless network; receive, from the user, a selection of at least one of the one or more unique identifiers; based on the selection, identify one or more resource accounts associated with each of the one or more unique identifiers; receive, from the user, resource transfer data associated with the resource transfer; and execute the resource transfer based on the selection and the resource transfer data.

In some embodiments, performing the scan of the wireless communication channel comprises transmitting a query to each of the endpoint devices within the wireless network, wherein the query comprises a request for each of the endpoint devices to identify itself; and receiving a response from each of the endpoint devices, wherein the response comprises the one or more unique identifiers.

In some embodiments, receiving the request from the user comprises detecting that the user has opened a resource sharing application; prompting the user to input authentication credentials into the resource sharing application; receiving the authentication credentials from the user; validating the authentication credentials using a backend authentication server; and granting authorized access to initiate the resource transfer.

In some embodiments, receiving the selection of the at least one of the one or more unique identifiers comprises presenting a graphical interface to the user, wherein the graphical interface comprises a list of the one or more unique identifiers, wherein each of the one or more unique identifiers is associated with an interactable interface element; and detecting that the user has interacted with the interactable interface element associated with the at least one of the one or more unique identifiers.

In some embodiments, the resource transfer data comprises at least one of a resource amount, a resource format, and resource transfer metadata.

In some embodiments, the wireless communication channel is a near-field communication ("NFC") channel.

In some embodiments, the wireless communication channel is a Wi-Fi connection.

Embodiments of the present disclosure also provide a computer program product for resource sharing over a secure wireless network communication channel, the computer program product comprising a non-transitory computer-readable medium comprising code causing an apparatus to receive a request from a user to initiate a resource transfer; perform a scan of a wireless communication channel for endpoint devices within a wireless network; identify, based on the scan, one or more unique identifiers associated with the endpoint devices within the wireless network; receive, from the user, a selection of at least one of the one or more unique identifiers; based on the selection, identify one or more resource accounts associated with each of the one or more unique identifiers; receive, from the user, resource transfer data associated with the resource transfer; and execute the resource transfer based on the selection and the resource transfer data.

In some embodiments, performing the scan of the wireless communication channel comprises transmitting a query to each of the endpoint devices within the wireless network, wherein the query comprises a request for each of the endpoint devices to identify itself; and receiving a response from each of the endpoint devices, wherein the response comprises the one or more unique identifiers.

In some embodiments, receiving the request from the user comprises detecting that the user has opened a resource sharing application; prompting the user to input authentication credentials into the resource sharing application; receiving the authentication credentials from the user; validating the authentication credentials using a backend authentication server; and granting authorized access to initiate the resource transfer.

In some embodiments, receiving the selection of the at least one of the one or more unique identifiers comprises presenting a graphical interface to the user, wherein the graphical interface comprises a list of the one or more unique identifiers, wherein each of the one or more unique identifiers is associated with an interactable interface element; and detecting that the user has interacted with the interactable interface element associated with the at least one of the one or more unique identifiers.

In some embodiments, the wireless communication channel is a near-field communication ("NFC") channel.

In some embodiments, the wireless communication channel is a Wi-Fi connection.

Embodiments of the present disclosure also provide a computer-implemented method for resource sharing over a secure wireless network communication channel, the computer-implemented method comprising receiving a request from a user to initiate a resource transfer; performing a scan of a wireless communication channel for endpoint devices within a wireless network; identifying, based on the scan, one or more unique identifiers associated with the endpoint devices within the wireless network; receiving, from the user, a selection of at least one of the one or more unique identifiers; based on the selection, identifying one or more resource accounts associated with each of the one or more unique identifiers; receiving, from the user, resource transfer data associated with the resource transfer; and executing the resource transfer based on the selection and the resource transfer data.

In some embodiments, performing the scan of the wireless communication channel comprises transmitting a query to each of the endpoint devices within the wireless network, wherein the query comprises a request for each of the endpoint devices to identify itself; and receiving a response from each of the endpoint devices, wherein the response comprises the one or more unique identifiers.

In some embodiments, receiving the request from the user comprises detecting that the user has opened a resource sharing application; prompting the user to input authentication credentials into the resource sharing application; receiving the authentication credentials from the user; validating the authentication credentials using a backend authentication server; and granting authorized access to initiate the resource transfer.

In some embodiments, receiving the selection of the at least one of the one or more unique identifiers comprises presenting a graphical interface to the user, wherein the graphical interface comprises a list of the one or more unique identifiers, wherein each of the one or more unique identifiers is associated with an interactable interface element; and detecting that the user has interacted with the interactable interface element associated with the at least one of the one or more unique identifiers.

In some embodiments, the resource transfer data comprises at least one of a resource amount, a resource format, and resource transfer metadata.

In some embodiments, the wireless communication channel is a near-field communication ("NFC") channel.

In some embodiments, the wireless communication channel is a Wi-Fi connection.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
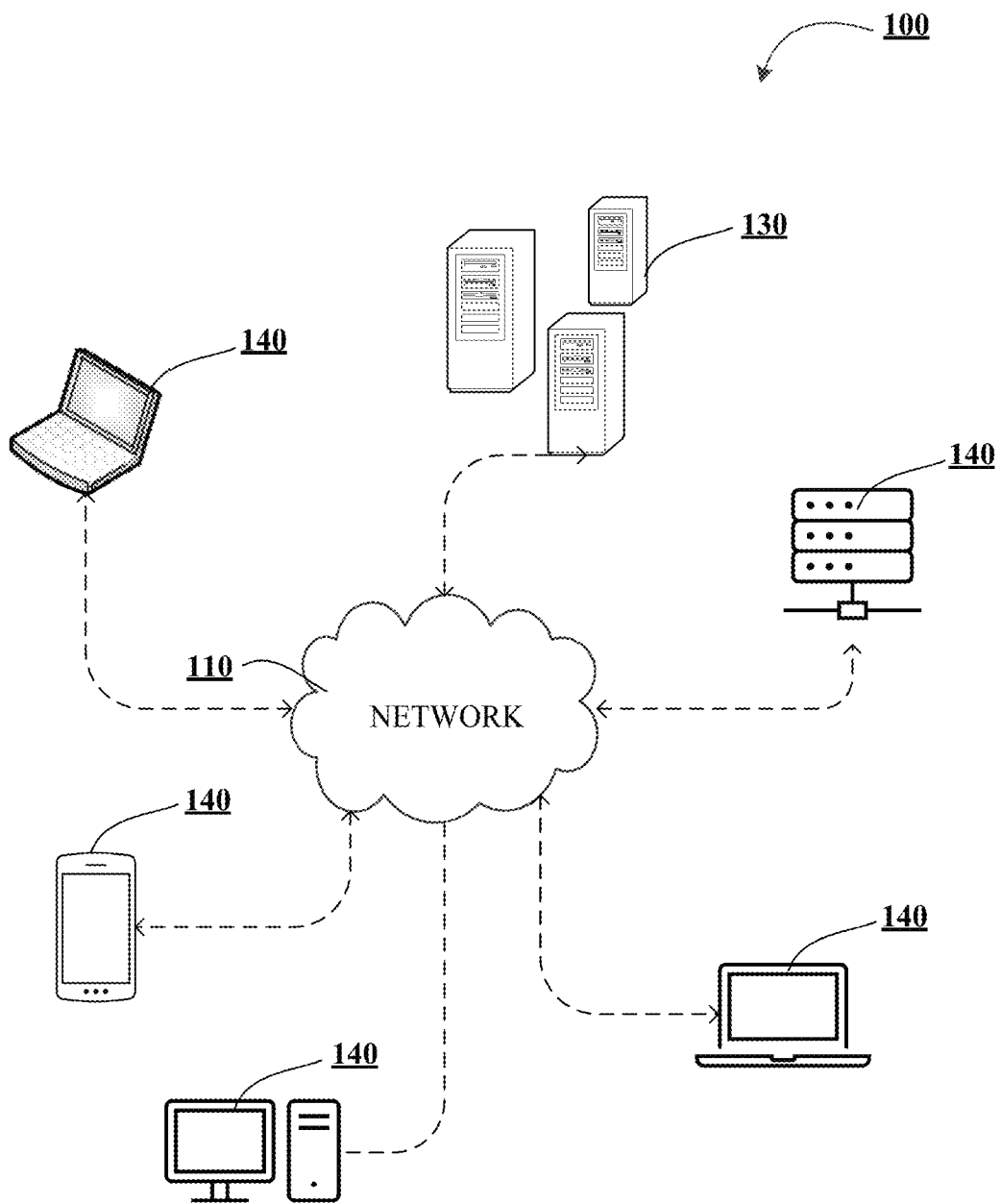
Figure 1B:
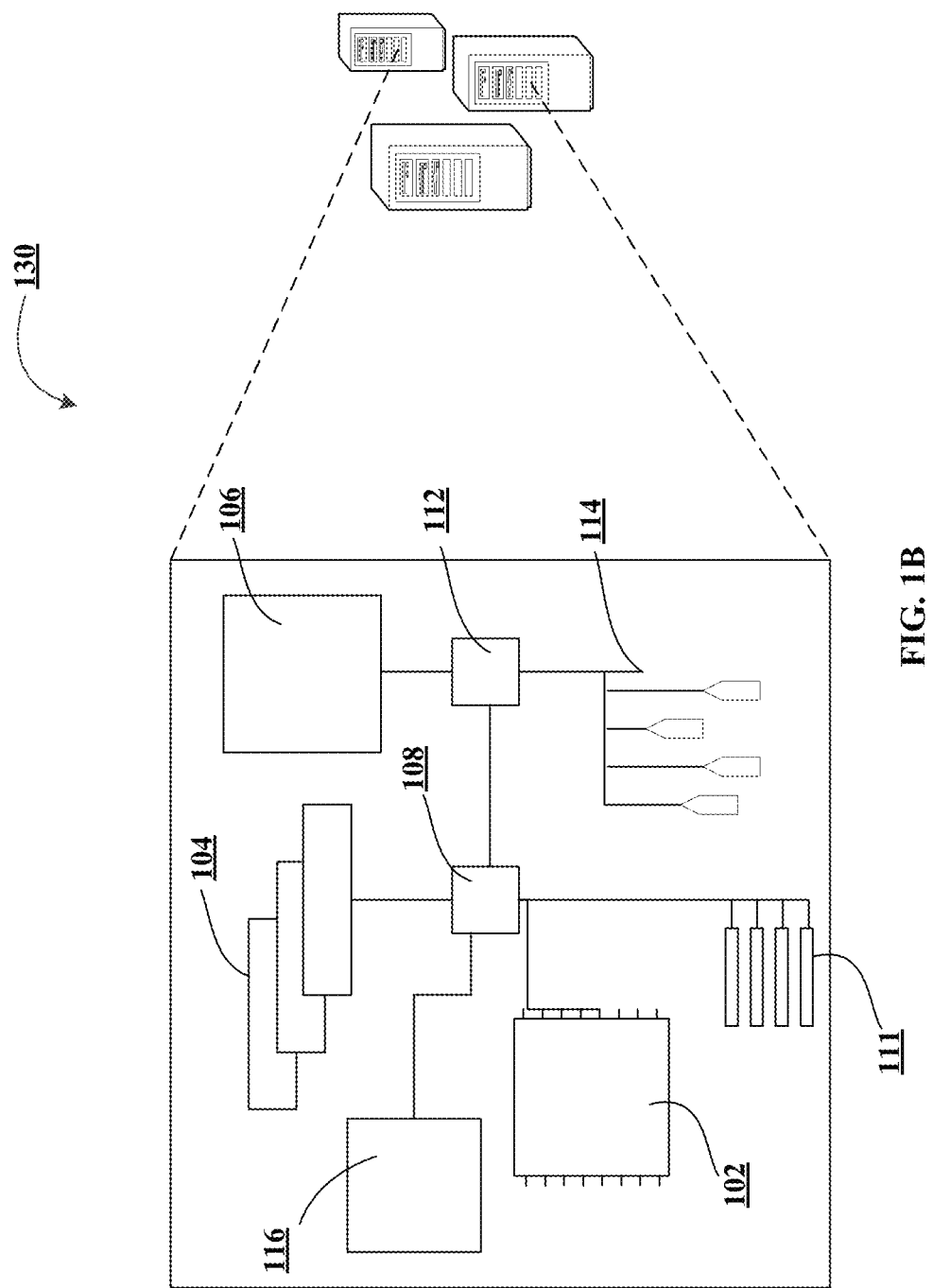
Figure 1C:
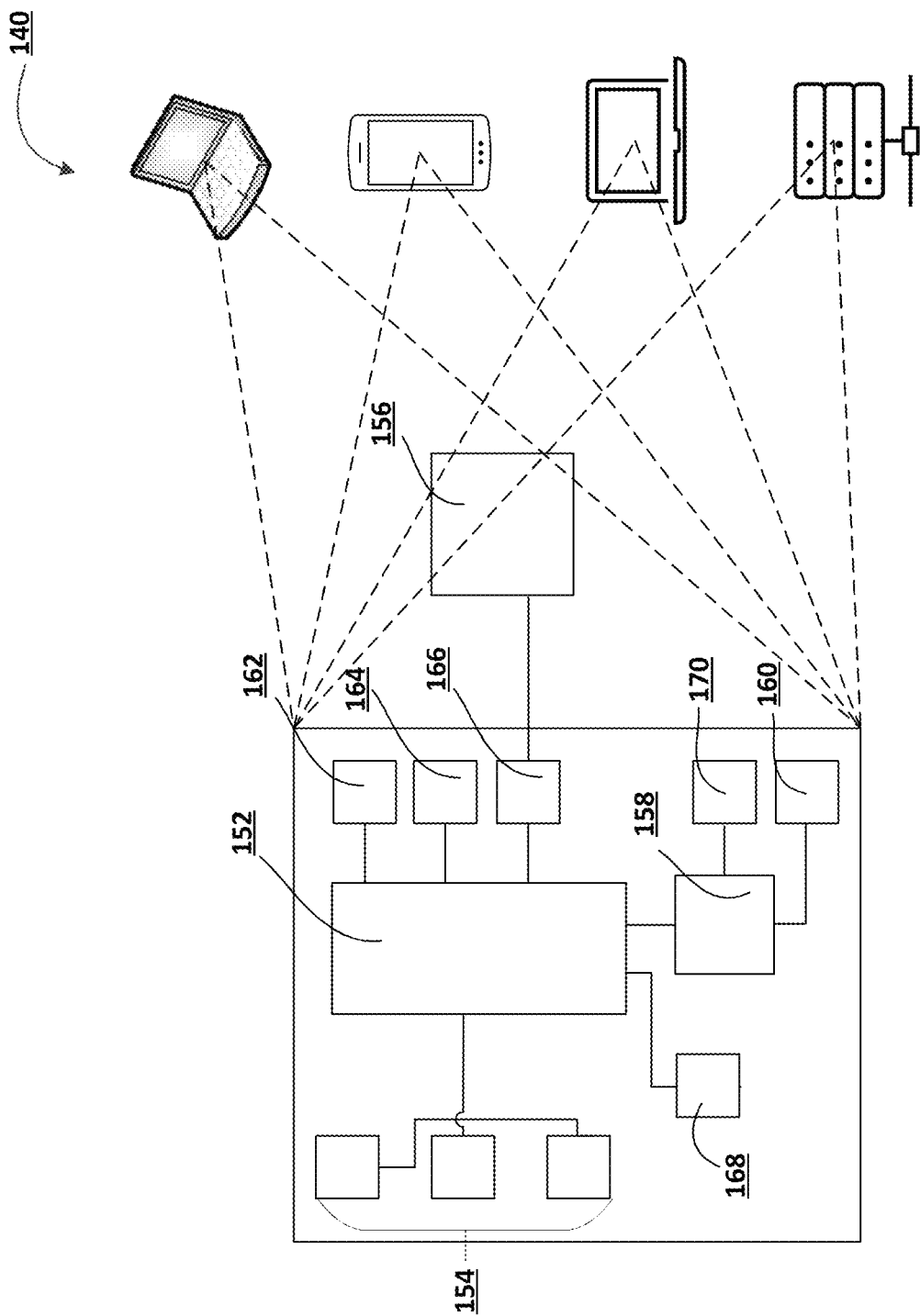
Figure 2:
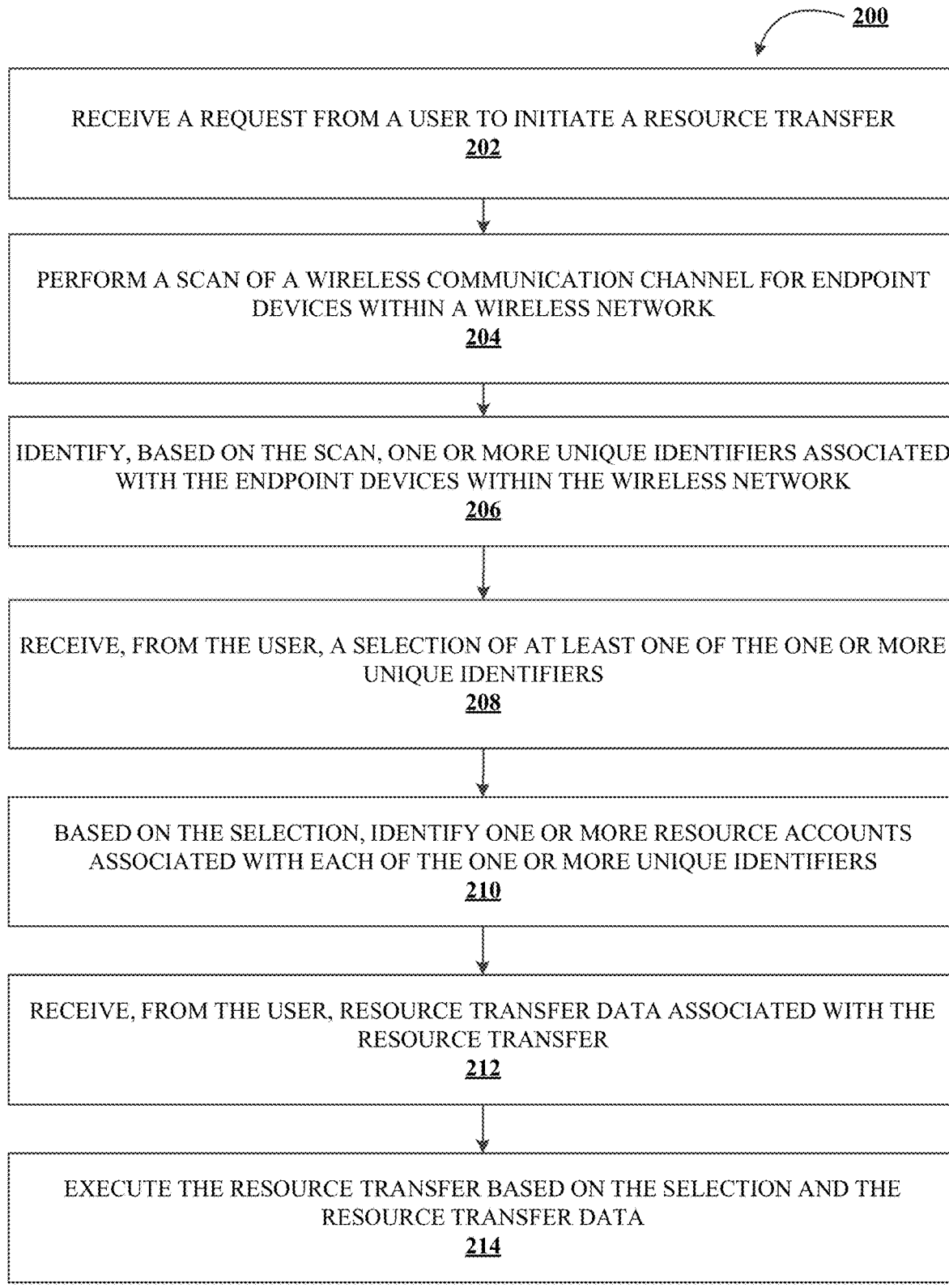
Figure 3A:
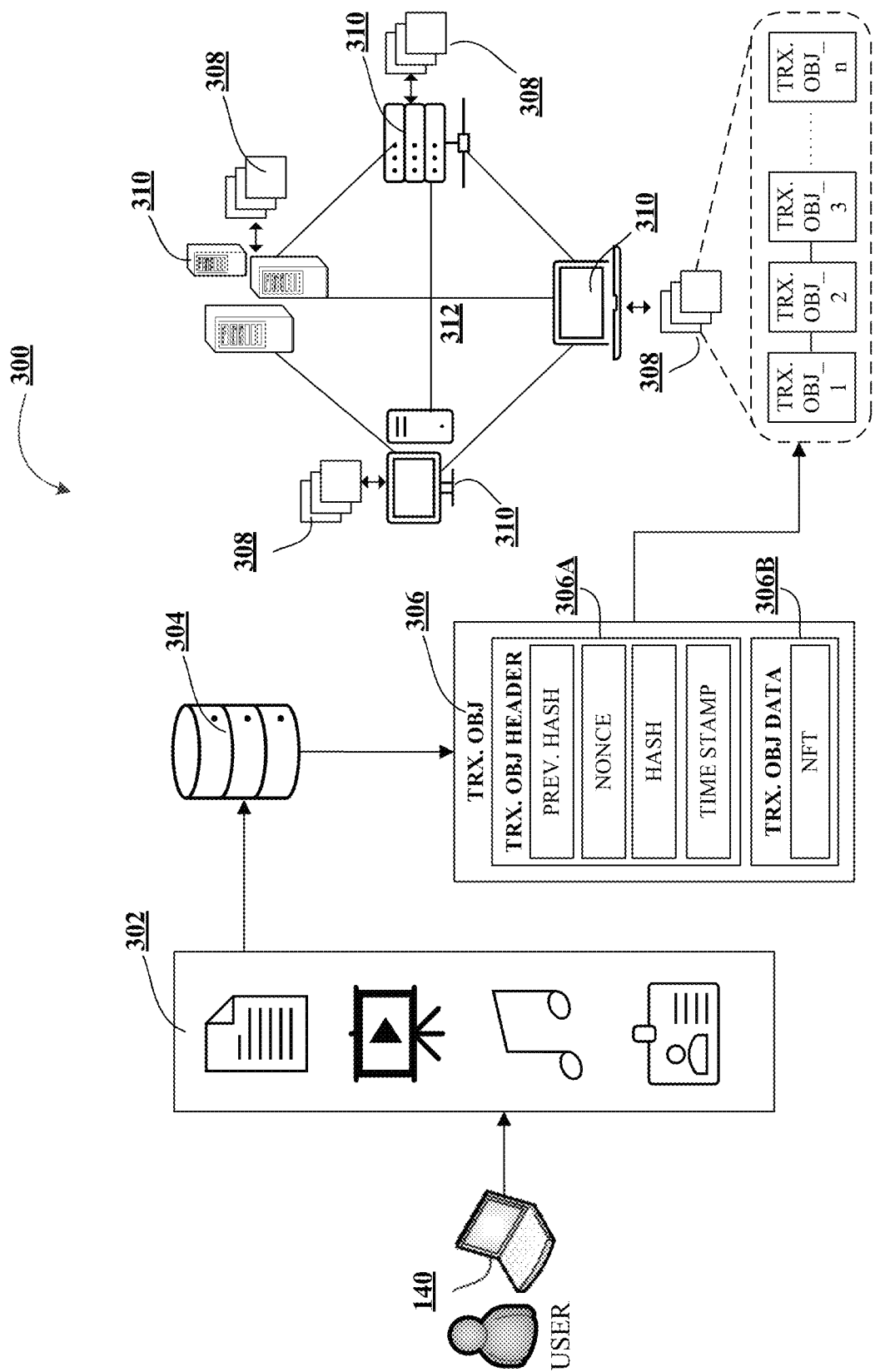
Figure 3B:
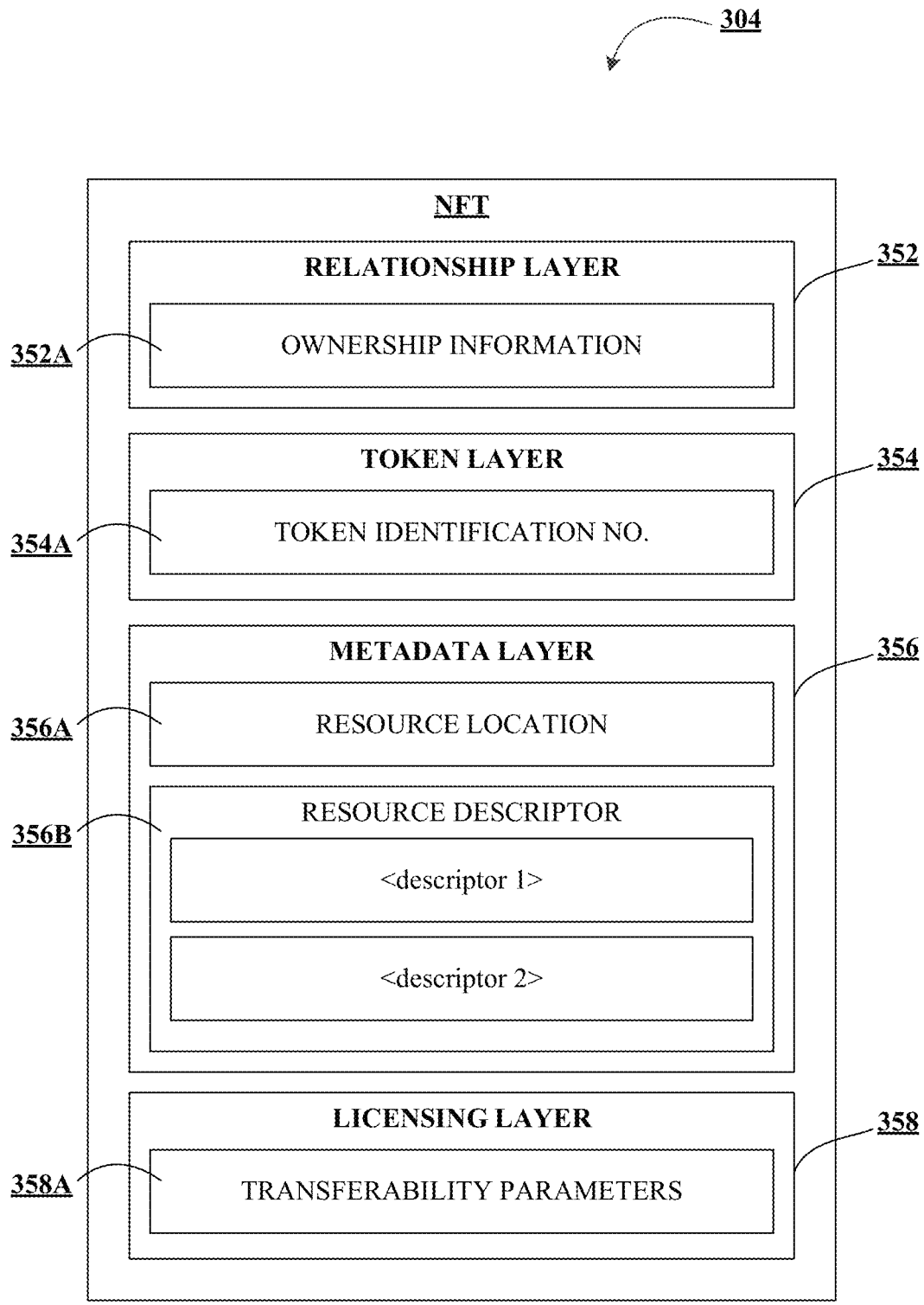

Having thus described embodiments of the invention in general terms, reference will now be made the accompanying drawings, wherein:

FIGS. 1A-1C illustrates technical components of an exemplary distributed computing environment for the system for resource sharing over a secure wireless network communication channel, in accordance with an embodiment of the present disclosure;

FIG. 2 illustrates a process flow for resource sharing over a secure wireless network communication channel, in accordance with an embodiment of the present disclosure;

FIG. 3A illustrates an exemplary process of creating an NFT, in accordance with an embodiment of the invention; and FIG. 3B illustrates an exemplary NFT as a multi-layered documentation of a resource, in accordance with an embodiment of an invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface ("GUI") or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may generally refer to physical or virtual objects that may be used to accomplish the entity's objectives. In this regard, the resources may include computing resources such as processing power, memory allocation, cache space, storage space, data files, network connections and/or bandwidth, electrical power, input/output functions, and the like, or data files (e.g., document files, media files, system files, and/or the like). In other embodiments, resources may refer to financial resources such as funds or digital currencies, where such resources may be linked to an account associated with a user.

Embodiments of the present disclosure provide a system for resource sharing over a secure wireless network communication channel. In this regard, the system may comprise one or more endpoint devices connected to one another over a wireless communication channel. The wireless communication channel may in some embodiments be a near-field communication ("NFC") channel, though it is within the score of the disclosure for the wireless communication channel to use other types of protocols, such as Wi-Fi, Bluetooth, and/or the like. An application may be installed on each of the endpoint devices, where the application may be configured to cause the endpoint device to scan the wireless communication channel to identify other endpoint devices that are running instances of the application. In some embodiments the endpoint devices identified during the scan may be within a set proximity or range of the scanning endpoint device (e.g., within 50 feet). Accordingly, in such embodiments, the system scans the wireless communication channel for endpoint devices that are proximate to or near the scanning endpoint device.

Each of the instances of the application and/or the endpoint devices may be associated with a unique identifier, where the unique identifier may in turn be associated with one or more resource accounts associated with a unique user. Accordingly, the application may present the various unique identifiers detected during the wireless scan and allow the user to select a unique identifier to initiate a resource transfer process. In some embodiments, the application may further receive user inputs comprising other types of information, such as the amount of resources to be transferred, a format for the resources to be transferred, transfer metadata (e.g., a description of the resource transfer), and/or the like (which may collectively be referred to herein as "resource transfer data"). Once the application receives the selection of the user device and/or the resource transfer data from the user, the system may retrieve resource account information associated with the selected user device and execute a resource transfer based on the resource transfer data received from the user.

In some embodiments, the unique identifiers associated with the various endpoint devices and/or resource accounts may be stored as a non-fungible token ("NFT"). An NFT is a cryptographic record (referred to as "tokens") linked to a resource. An NFT is typically stored on a distributed ledger that certifies ownership and authenticity of the resource, and exchangeable in a peer-to-peer network. By storing the unique identifier as an NFT, the system may provide a durable record of ownership of endpoint devices and/or resource accounts that may be used by the system as described elsewhere herein.

An exemplary embodiment is described as follows for illustrative purposes only and is not intended to restrict the scope of the disclosure provided herein. In one embodiment, a user may wish to initiate a transaction (e.g., a resource transfer) with another user who may be located close proximity (e.g., 10 feet). In such an embodiment, the user may use a smart phone (e.g., endpoint device) to access an application provided by a financial institution that maintains one or more resource accounts on behalf of the user. The resource accounts may, for instance, be an account containing resources such as funds. In other embodiments, the resource account may be a digital wallet that may contain digital currencies.

The application may require that the user provide authentication credentials associated with the one or more resource accounts in order to use the application. Examples of such authentication credentials may include a username and password, identifying characteristic data (e.g., fingerprint data, iris data, voice sample data, and/or the like), secure token, or the like. Once the system has received the authentication credentials and has verified the identity of the user (e.g., by a backend authentication server), the system may execute a scan of nearby endpoint devices that are eligible recipients of resource transfers. In this regard, the user's endpoint device may scan a wireless communication channel (e.g., NFC or Wi-Fi channel) for other endpoint devices that have the financial entity-provided application installed. Such endpoint devices may be configured to respond to queries from the requesting endpoint device (e.g., through a service running in the background of the eligible endpoint devices) that may be sent over the wireless communication channel.

Once the eligible endpoint devices (or "recipient endpoint devices") have been scanned, the user's endpoint device may generate a list of unique identifiers received from each of the eligible endpoint devices in response to the query. The endpoint device may then present the list of unique identifiers on a graphical user interface the display (e.g., screen) of the endpoint device. Alternatively, the endpoint device may present other types of information associated with each unique identifier (e.g., a name of the user associated with each unique identifier). Each unique identifier presented on the graphical user interface may in turn be associated with an interactable interface element (e.g., a button, selectable area, and/or the like) that may be selected by the user to identify the intended recipient of the transaction.

Once the system receives a selection of a unique identifier from the user, the system may then present an interface on the endpoint device configured to receive additional information regarding the transaction (e.g., the resource transfer data). In this regard, the user may be prompted to provide information such as a transaction amount, resource transfer format (e.g., currency), transaction details or description, source resource account (e.g., the account from which the resources are to be pulled to execute the transaction), and/or the like. Upon receiving the relevant resource transfer data from the user, the system may retrieve resource account information associated with the unique identifier of the recipient endpoint device. The system may then execute the transaction based on the resource transfer data and the resource account information associated with the unique identifier of the recipient.

The system as described herein provides a number of technological benefits over conventional resource transfer systems. In particular, by providing an interface through which users may initiate resource transfers over a secure wireless communication channel, the system may obviate the need to make server calls in order to perform user account lookups before initiating resource transfers, thereby saving computing resources such as processing power, network bandwidth, memory space, and/or the like. Furthermore, the system greatly reduces the friction experienced by users when executing resource transfers by allowing users to rapidly identify recipients through nearby endpoint devices and directly transfer resources to the eligible recipients.

FIGS. 1A-1C illustrate technical components of an exemplary distributed computing environment 100 for the system for resource sharing over a secure wireless network communication channel. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for resource sharing over a secure wireless network communication channel, in accordance with an embodiment of the present disclosure. The process begins at block 202, where the system receives a request from a user to initiate a resource transfer. In this regard, the user may be a client of an entity such as a financial institution who may wish to execute a transfer of resources to another user. Accordingly, in some embodiments, receiving the request from the user may comprise detecting that the user has accessed or opened a resource sharing application on the user's endpoint device (e.g., smartphone). In some embodiments, upon detecting the user open the application, the system may prompt the user for authentication credentials. Upon receiving the authentication credentials from the user, the system may verify the authentication credentials using a backend authentication server. Once the credentials have been verified, the application may proceed with the resource sharing process.

The process continues to block 204, where the system performs a scan of a wireless communication channel for endpoint devices within a wireless network. In some embodiments, the system may be configured to scan for devices within a close proximity to the endpoint device that is initiating the resource transfer. For instance, in some embodiments, the wireless communication channel may be an NFC channel, such that the system scans for devices within a few inches of the requesting endpoint device. In other embodiments, the wireless communication channel may be a Wi-Fi connection, such that the system scans for devices connected to the same Wi-Fi network (e.g., within a few hundred feet). In performing the scan, the system may transmit queries to the various endpoint devices within the network, wherein the queries each comprises a request for the endpoint device to identify itself as a potential recipient of the resource transfer process.

The process continues to block 206, where the system identifies, based on the scan, one or more unique identifiers associated with the endpoint devices within the wireless network. In particular, the one or more unique identifiers may be transmitted to the requesting endpoint device in response to the queries submitted by the requesting endpoint device. Each of the unique identifiers may in turn be associated with one or more resource accounts of the users of the endpoint devices detected by the system. By responding to the requesting endpoint device's query, the endpoint devices in the network identify themselves as potential recipients of the resource transfer. Accordingly, once the system receives the one or more unique identifiers, the system may present the one or more unique identifiers on the display device of the requesting endpoint device.

The process continues to block 208, where the system receives, from the user, a selection of at least one of the one or more unique identifiers. Each of the one or more unique identifiers may be linked with an interface element that allows the user to select the recipient of the resource transfer. In some embodiments, rather than displaying the unique identifier (which may be a character string such as a cryptographic hash value, a MAC address, IP address, device name, and/or the like), the system may display a name associated with each unique identifier (e.g., the name of the owner of the endpoint device). Accordingly, the user may select the target recipient by interacting (e.g., a mouse click, touch input, key stroke and/or the like) with the interface element associated with the unique identifier.

The process continues to block 210, where the system based on the selection, identifies one or more resource accounts associated with each of the one or more unique identifiers. In particular, each unique identifier may be uniquely associated with an endpoint device and/or one or more resource accounts, which may be held by the entity or another third-party institution on behalf of the user associated with the endpoint device and/or unique identifier. Accordingly, the system may access a database (e.g., an internal database or third-party database) to retrieve the resource account information (e.g., resource account number, cryptographic address, digital wallet address, and/or the like) for the intended recipient of the resource transfer.

The process continues to block 212, where the system receives, from the user, resource transfer data associated with the resource transfer. Upon receiving the selection from the user of the unique identifier (e.g., the recipient), the system may present a graphical interface on the display of the endpoint device of the user, where the graphical interface may comprise one or more interactive elements for receiving the resource transfer data from the user, where the resource transfer data includes the information needed by the system to process the resource transfer. In this regard, the resource transfer data may include parameters such as a resource amount, resource transfer metadata (e.g., a description of the resource transfer, such as a reason for the transfer), a resource transfer format (e.g., a specific currency or digital currency), and/or the like.

The process continues to block 214, where the system executes the resource transfer based on the selection and the resource transfer data. Once the resource transfer data is received, the system may read the resource transfer data and execute the resource transfer to the intended recipient (as identified by the user through selection of the unique identifier associated with the intended recipient) according to the parameters defined in the resource transfer data. In some embodiments, the system may be configured to present a notification to the user (e.g., on the display of the endpoint device) regarding the status of the resource transfer. In this regard, the notification may indicate that the resource transfer has been successfully completed or that the resource transfer has failed. In cases in which the resource transfer has failed, the notification may include an error code or description of the reason for the failure.

FIG. 3A illustrates an exemplary process of creating an NFT 300, in accordance with an embodiment of the invention. As shown in FIG. 3A, to create or "mint" an NFT, a user (e.g., NFT owner) may identify, using a user input device 140, resources 302 that the user wishes to mint as an NFT. Typically, NFTs are minted from digital objects that represent both tangible and intangible objects. These resources 302 may include a piece of art, music, collectible, videos, real-world items such as artwork and real estate, or any other presumed valuable object. These resources 302 are then digitized into a proper format to produce an NFT 304. The NFT 304 may be a multi-layered documentation that identifies the resources 302 but also evidences various transaction conditions associated therewith, as described in more detail with respect to FIG. 3A.

To record the NFT in a distributed ledger, a transaction object 306 for the NFT 304 is created. The transaction object 306 may include a transaction header 306A and a transaction object data 306B. The transaction header 306A may include a cryptographic hash of the previous transaction object, a nonce—a randomly generated 32-bit whole number when the transaction object is created, cryptographic hash of the current transaction object wedded to the nonce, and a time stamp. The transaction object data 306B may include the NFT 304 being recorded. Once the transaction object 306 is generated, the NFT 204 is considered signed and forever tied to its nonce and hash. Once generated, the transaction object 306 is then deployed in the distributed ledger 308. At this time, a distributed ledger address is generated for the transaction object 306, i.e., an indication of where it is located on the distributed ledger 308 and captured for recording purposes. Once deployed, the NFT 304 is linked permanently to its hash and the distributed ledger 308, and is considered recorded in the distributed ledger 308, thus concluding the minting process As shown in FIG. 3A, the distributed ledger 308 may be maintained on multiple devices (nodes) 310 that are authorized to keep track of the distributed ledger 308. For example, these nodes 310 may be computing devices such as system 130 and client device(s) 130. One node 310 may have a complete or partial copy of the entire distributed ledger 308 or set of transactions and/or transaction objects on the distributed ledger 308. Transactions, such as the creation and recordation of a NFT, are initiated at a node and communicated to the various nodes. Any of the nodes can validate a transaction, record the transaction to its copy of the distributed ledger, and/or broadcast the transaction, its validation (in the form of a transaction object) and/or other data to other nodes.

FIG. 3B illustrates an exemplary NFT 304 as a multi-layered documentation of a resource, in accordance with an embodiment of an invention. As shown in FIG. 3B, the NFT may include at least relationship layer 352, a token layer 354, a metadata layer 356, and a licensing layer 358. The relationship layer 352 may include ownership information 352A, including a map of various users that are associated with the resource and/or the NFT 304, and their relationship to one another. For example, if the NFT 304 is purchased by buyer B1 from a seller S1, the relationship between B1 and S1 as a buyer-seller is recorded in the relationship layer 352. In another example, if the NFT 304 is owned by O1 and the resource itself is stored in a storage facility by storage provider SP1, then the relationship between O1 and SP1 as owner-file storage provider is recorded in the relationship layer 352. The token layer 354 may include a token identification number 354A that is used to identify the NFT 304. The metadata layer 356 may include at least a file location 356A and a file descriptor 356B. The file location 356A may provide information associated with the specific location of the resource 302. Depending on the conditions listed in the smart contract underlying the distributed ledger 308, the resource 302 may be stored on-chain, i.e., directly on the distributed ledger 308 along with the NFT 304, or off-chain, i.e., in an external storage location. The file location 356A identifies where the resource 302 is stored. The file descriptor 356B may include specific information associated with the source itself 302. For example, the file descriptor 356B may include information about the supply, authenticity, lineage, provenance of the resource 302. The licensing layer 358 may include any transferability parameters 358B associated with the NFT 304, such as restrictions and licensing rules associated with purchase, sale, and any other types of transfer of the resource 302 and/or the NFT 304 from one person to another. Those skilled in the art will appreciate that various additional layers and combinations of layers can be configured as needed without departing from the scope and spirit of the invention.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for resource sharing over a secure wireless network communication channel, the system comprising:
   at least one non-transitory storage device; and
   at least one processor coupled to the at least one non-transitory storage device, wherein the at least one processor is configured to:
      receive a request from a user to initiate a resource transfer;
      perform a scan of a wireless communication channel for endpoint devices within a wireless network, wherein the scan transmits queries to the endpoint devices within the wireless network, wherein the queries each comprises a request for each endpoint device to identify itself as a recipient of the resource transfer;
      identify, based on the scan, one or more unique identifiers associated with the endpoint devices within the wireless network, wherein the one or more unique identifiers associated with the endpoint devices within the wireless network are transmitted to a requesting endpoint device in response to the queries and are non-fungible tokens (NFT) comprising multi-layered documentation of a resource;
      receive, from the user, a selection of at least one of the one or more unique identifiers;
      based on the selection, identify one or more resource accounts associated with each of the one or more unique identifiers;
      receive, from the user, resource transfer data associated with the resource transfer; and
      execute the resource transfer based on the selection and the resource transfer data.

2. The system of claim 1, wherein performing the scan of the wireless communication channel comprises:
   transmitting a query to each of the endpoint devices within the wireless network, wherein the query comprises a request for each of the endpoint devices to identify itself; and
   receiving a response from each of the endpoint devices, wherein the response comprises the one or more unique identifiers.

3. The system of claim 1, wherein receiving the request from the user comprises:
   detecting that the user has opened a resource sharing application;
   prompting the user to input authentication credentials into the resource sharing application;
   receiving the authentication credentials from the user;
   validating the authentication credentials using a backend authentication server; and
   granting authorized access to initiate the resource transfer.

4. The system of claim 1, wherein receiving the selection of the at least one of the one or more unique identifiers comprises:
   presenting a graphical interface to the user, wherein the graphical interface comprises a list of the one or more unique identifiers, wherein each of the one or more unique identifiers is associated with an interactable interface element; and
   detecting that the user has interacted with the interactable interface element associated with the at least one of the one or more unique identifiers.

5. The system of claim 1, wherein the resource transfer data comprises at least one of a resource amount, a resource format, and resource transfer metadata.

6. The system of claim 1, wherein the wireless communication channel is a near-field communication ("NFC") channel.

7. The system of claim 1, wherein the wireless communication channel is a Wi-Fi connection.

8. A computer program product for resource sharing over a secure wireless network communication channel, the computer program product comprising a non-transitory computer-readable medium comprising code causing an apparatus to:
   receive a request from a user to initiate a resource transfer;
   perform a scan of a wireless communication channel for endpoint devices within a wireless network, wherein the scan transmits queries to the endpoint devices within the wireless network, wherein the queries each comprises a request for each endpoint device to identify itself as a recipient of the resource transfer;
   identify, based on the scan, one or more unique identifiers associated with the endpoint devices within the wireless network, wherein the one or more unique identifiers associated with the endpoint devices within the wireless network are transmitted to a requesting endpoint device in response to the queries and are non-fungible tokens (NFT) comprising multi-layered documentation of a resource;
   receive, from the user, a selection of at least one of the one or more unique identifiers;
   based on the selection, identify one or more resource accounts associated with each of the one or more unique identifiers;
   receive, from the user, resource transfer data associated with the resource transfer; and
   execute the resource transfer based on the selection and the resource transfer data.

9. The computer program product of claim 8, wherein performing the scan of the wireless communication channel comprises:
 transmitting a query to each of the endpoint devices within the wireless network, wherein the query comprises a request for each of the endpoint devices to identify itself; and
 receiving a response from each of the endpoint devices, wherein the response comprises the one or more unique identifiers.

10. The computer program product of claim 8, wherein receiving the request from the user comprises:
 detecting that the user has opened a resource sharing application;
 prompting the user to input authentication credentials into the resource sharing application;
 receiving the authentication credentials from the user;
 validating the authentication credentials using a backend authentication server; and
 granting authorized access to initiate the resource transfer.

11. The computer program product of claim 8, wherein receiving the selection of the at least one of the one or more unique identifiers comprises:
 presenting a graphical interface to the user, wherein the graphical interface comprises a list of the one or more unique identifiers, wherein each of the one or more unique identifiers is associated with an interactable interface element; and
 detecting that the user has interacted with the interactable interface element associated with the at least one of the one or more unique identifiers.

12. The computer program product of claim 8, wherein the wireless communication channel is a near-field communication ("NFC") channel.

13. The computer program product of claim 8, wherein the wireless communication channel is a Wi-Fi connection.

14. A computer-implemented method for resource sharing over a secure wireless network communication channel, the computer-implemented method comprising:
 receiving a request from a user to initiate a resource transfer;
 performing a scan of a wireless communication channel for endpoint devices within a wireless network, wherein the scan transmits queries to the endpoint devices within the wireless network, wherein the queries each comprises a request for each endpoint device to identify itself as a recipient of the resource transfer;
 identifying, based on the scan, one or more unique identifiers associated with the endpoint devices within the wireless network, wherein the one or more unique identifiers associated with the endpoint devices within the wireless network are transmitted to a requesting endpoint device in response to the queries and are non-fungible tokens (NFT) comprising multi-layered documentation of a resource;
 receiving, from the user, a selection of at least one of the one or more unique identifiers;
 based on the selection, identifying one or more resource accounts associated with each of the one or more unique identifiers;
 receiving, from the user, resource transfer data associated with the resource transfer; and
 executing the resource transfer based on the selection and the resource transfer data.

15. The computer-implemented method of claim 14, wherein performing the scan of the wireless communication channel comprises:
 transmitting a query to each of the endpoint devices within the wireless network, wherein the query comprises a request for each of the endpoint devices to identify itself; and
 receiving a response from each of the endpoint devices, wherein the response comprises the one or more unique identifiers.

16. The computer-implemented method of claim 14, wherein receiving the request from the user comprises:
 detecting that the user has opened a resource sharing application;
 prompting the user to input authentication credentials into the resource sharing application;
 receiving the authentication credentials from the user;
 validating the authentication credentials using a backend authentication server; and
 granting authorized access to initiate the resource transfer.

17. The computer-implemented method of claim 14, wherein receiving the selection of the at least one of the one or more unique identifiers comprises:
 presenting a graphical interface to the user, wherein the graphical interface comprises a list of the one or more unique identifiers, wherein each of the one or more unique identifiers is associated with an interactable interface element; and
 detecting that the user has interacted with the interactable interface element associated with the at least one of the one or more unique identifiers.

18. The computer-implemented method of claim 14, wherein the resource transfer data comprises at least one of a resource amount, a resource format, and resource transfer metadata.

19. The computer-implemented method of claim 14, wherein the wireless communication channel is a near-field communication ("NFC") channel.

20. The computer-implemented method of claim 14, wherein the wireless communication channel is a Wi-Fi connection.

\* \* \* \* \*